(12) United States Patent
Shetty et al.

(10) Patent No.: US 8,995,424 B2
(45) Date of Patent: Mar. 31, 2015

(54) NETWORK INFRASTRUCTURE PROVISIONING WITH AUTOMATED CHANNEL ASSIGNMENT

(75) Inventors: Sudhir Vittal Shetty, Cedar Park, TX (US); James W. Arendt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 13/478,745

(22) Filed: May 23, 2012

(65) Prior Publication Data

US 2013/0315096 A1 Nov. 28, 2013

(51) Int. Cl.
*H04L 12/28* (2006.01)
*H04L 12/24* (2006.01)

(52) U.S. Cl.
CPC .................................. *H04L 41/0886* (2013.01)
USPC ........................................................ 370/351

(58) Field of Classification Search
USPC .................................. 370/229–254, 351–431
See application file for complete search history.

(56) References Cited

U.S. PATENT DOCUMENTS

| 6,597,956 | B1* | 7/2003 | Aziz et al. ......................... 700/3 |
| 7,203,770 | B2* | 4/2007 | Terai et al. ........................ 710/3 |
| 7,440,393 | B2 | 10/2008 | Nilakantan et al. |
| 7,483,971 | B2 | 1/2009 | Sylvest et al. |
| 7,752,295 | B2* | 7/2010 | Terai et al. ..................... 709/223 |
| 7,831,736 | B1 | 11/2010 | Thompson |
| 2006/0126654 | A1 | 6/2006 | Nilakantan et al. |
| 2008/0091929 | A1 | 4/2008 | Oberhaus et al. |
| 2009/0307761 | A1* | 12/2009 | Iyoda ............................... 726/4 |
| 2012/0254445 | A1* | 10/2012 | Kawamoto et al. ........... 709/226 |

* cited by examiner

*Primary Examiner* — Kwang B Yao
(74) *Attorney, Agent, or Firm* — Haynes and Boone, LLP (57) ABSTRACT

A network infrastructure provisioning system includes a server including a plurality of server ports. At least one switch is coupled to the server and includes a plurality of switch ports. A controller is coupled to the server and the at least one switch. The controller is operable to assign channels to server traffic, enumerate at least some of the plurality of server ports, determine switch ports associated with the enumerated server ports, and assign channels to the switch ports that are associated with the enumerated server ports. The assigning of channels to the switch ports may include assigning a primary storage channel to a first enumerated server port, assigning a primary networking channel to a last enumerated server port, assigning a secondary storage channel to an intermediate enumerated server port, and assigning a secondary networking channel to an intermediate enumerated server port.

20 Claims, 10 Drawing Sheets

NETWORK INFRASTRUCTURE PROVISIONING WITH AUTOMATED CHANNEL ASSIGNMENT

BACKGROUND

The present disclosure relates generally to information handling systems, and more particularly to the automated assignment of channels during the provisioning of a network infrastructure for a workload.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventionally, the provisioning of a network infrastructure for a workload requires the manual assignment of channels, which define one or more virtual local area networks (VLANs) that are allowed on a host-facing switch port, to the appropriate switches or ports of one or more physical switches. The manual steps to assign such channels are cumbersome and difficult to maintain as changes in the environment (e.g., cabling changes, switch changes, network changes) occur. For example, conventional provisioning of network infrastructure for a workload typically begins with an administrator providing network configuration information that may include the network name, a VLAN identification, and a primary and secondary channel identifier. The administrator then creates a deployment template and affiliates networks with the deployment template. The administrator then discovers the switch and affiliates channels at the switch level or the switch port level. The administrator then triggers a server discovery that results in the discovery of the servers and the server/switch topology. A user may then make a persona deployment request from the deployment template. In response, the system will select a server based on the channel assignment on the server-facing ports and the networks affiliated with the persona, and then provision the virtual networking layer in the persona and the VLANs on the physical switch corresponding to the assigned channels. As would be appreciated by one of skill in the art, the manual configuration described above provides a time consuming process that requires significant expertise to perform and maintain.

Accordingly, it would be desirable to provide for improved provisioning of a network infrastructure for a workload.

SUMMARY

According to one embodiment, a network infrastructure provisioning system includes a server including a plurality of server ports; at least one switch coupled to the server and including a plurality of switch ports; and a controller coupled to the server and the at least one switch, wherein the controller is operable to: assign channels to server traffic; enumerate at least some of the plurality of server ports; determine switch ports associated with the enumerated server ports; and assign channels to the switch ports that are associated with the enumerated server ports.

BRIEF DESCRIPTION OF THE DRAWINGS

FIG. 3b is a flow chart illustrating an embodiment of a method for assigning channels to switch ports in the method for network infrastructure provisioning of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
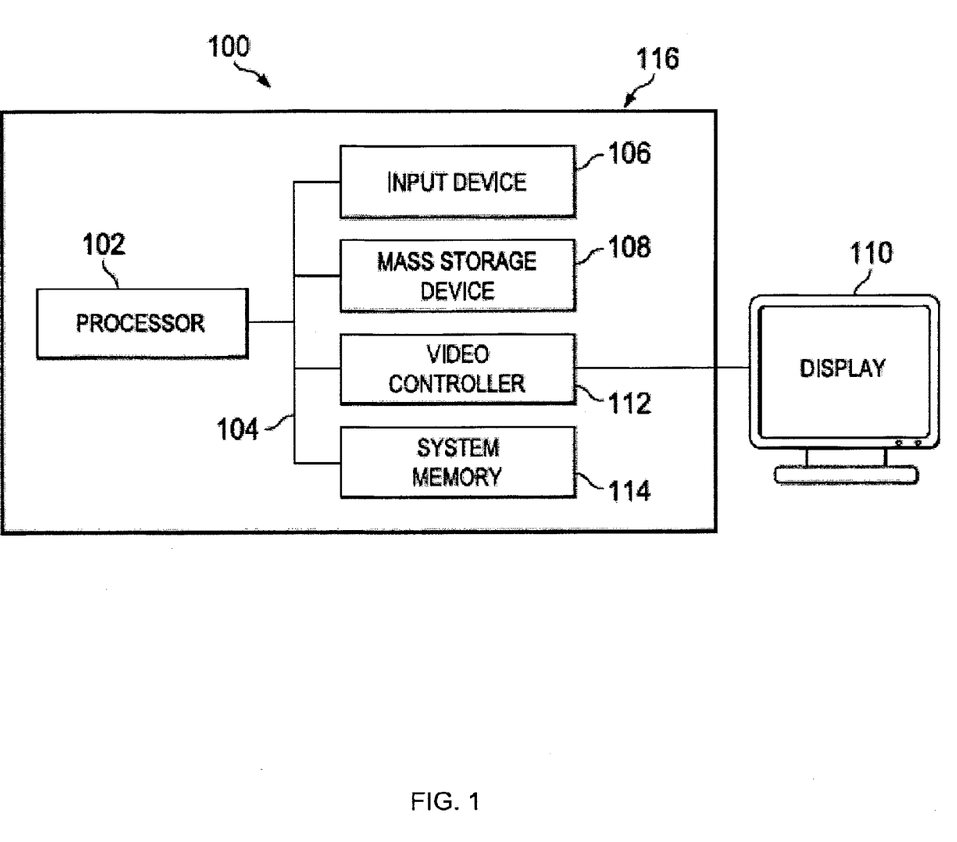
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
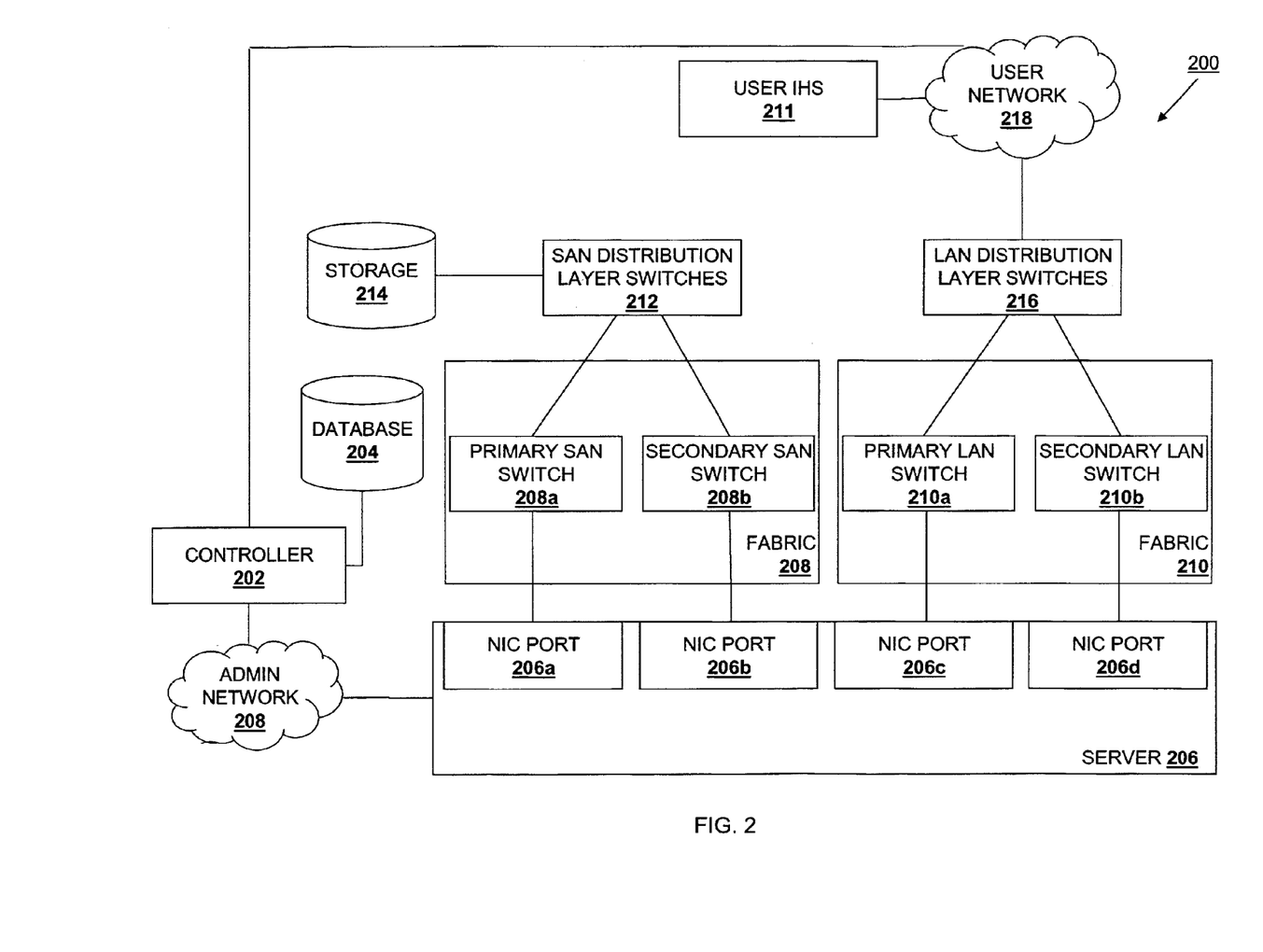
FIG. 2 is a schematic view illustrating an embodiment of a information handling system.

Referring now to FIG. 2, an information handling system (IHS) 200 is illustrated. In the illustrated embodiment, the IHS 200 is an example of an IHS configuration/topology following best practices around Local Area Network (LAN)/Storage Area Network (SAN) segregation while enabling high availability and redundancy in the switching fabric/IHS-switch connectivity. However, one of skill in the art will recognize that a variety of system topologies other than the IHS 200 will fall within the scope of the present disclosure.

The IHS 200 includes a controller 202 that centrally manages a plurality of heterogeneous servers, storage devices, networks, and/or a variety of other system components known in the art. In one embodiment, the controller 202 is an information handling system similar to IHS 100 with software configured to manage and monitor the IHS 200. In general, the controller 202 is operable to automatically distribute workloads and applications between hosts in the IHS 200 in response to user demand. In the embodiment discussed below, a host is illustrated and described as a server. However, a variety of different hosts known in the art will fall within the scope of the present disclosure. Rather than a network administrator having to manually install an operating system (OS) image and applications on each host in the system, the controller 202 is configured to choose an appropriate host for a workload and automatically install or boot and configure an OS image and applications on the host. This is accomplished by logically separating the host software from the host hardware. In this regard, the controller 202 manages a plurality of software images, called personas, that include an OS image, applications installed in the OS, and configuration metadata such as network configuration attributes. In some instances, personas may be simply referred to as operating system images even though they may contain an OS image, applications, configuration metadata, etc. These personas (or operating system images) may be booted on any suitable host in the system 200. The controller 202 is coupled to a database 204 to store and replicate these personas. In the illustrated embodiment, the database 204 may be a central storage repository such as a Fibre Channel storage area network (SAN), iSCSI target, or network-attached storage (NAS). However, in other embodiments, the database 204 may be integrated into the controller 202. Additionally, the controller 202 stores and continually updates an inventory of all hosts in the IHS 200. When the controller 202 receives a request to boot a specific persona, the controller 202 is operable to automatically select a host on which to provide the persona. The controller 202 may select a host in part on the network connectivity requirements of the persona to be booted. In some embodiments, a user may impose additional selection criteria to which the selected host must conform. After a host has been selected for a persona, the controller 202 is operable to boot the persona on the host and automatically configure the host according to the requirements of the persona. As one aspect of this, the controller 202 is operable to configure the physical NICs on the host to fulfill the persona's network connectivity requirements.

The IHS 200 includes a host that, in the illustrated embodiment, is a server 206. The server 206 may be an information handling systems similar to IHS 100 and may include a variety of different servers, workstations, blade servers, or other types of IHS's known in the art. While a single sever 206 is illustrated in FIG. 2, one of skill in the art will recognize that the controller 202 may be coupled to any plurality of hosts through a network 208. In one embodiment, the server 206 is communicatively coupled to the controller 202 via a dedicated system control network (e.g., the network 208) through which the controller 202 may issue commands, monitor, and deploy personas to hosts. As one aspect of this, the server 206 may include a management controller such as a baseboard management controller (BMC), an integrated Dell® remote access controller (iDRAC), or other out-of-band (OOB) controller. Further, the server 206 includes one or more physical network interfaces to communicate within the IHS 200. For example, in the illustrated embodiment, the server 206 includes one or more network interface card's (NIC's) having NIC ports 206a, 206b, 206c, and 206d. The one or more NICs may be, for example, LAN-on-Motherboard (LOM) NICs, PCI-based NICs, mezzanine NICs, or another suitable type of NIC. In other embodiments, the server 206 may additionally or alternatively include partitionable converged network adapters (CNAs) or partitionable Infiniband NICs.

The IHS 200 also includes interconnect fabric (e.g., a layer 2 interconnect fabric) that, in the illustrated embodiment, includes a storage fabric 208 and a networking fabric 210. In an embodiment, the storage fabric 208 includes both a primary SAN switch 208a and a secondary SAN switch 208b that are coupled to a plurality of SAN distribution layer switches 212 that are further coupled to a storage device 214. In an embodiment, the networking fabric 210 includes both a primary LAN switch 210a and a secondary LAN switch 210b that are coupled to a plurality of LAN distribution layer switches 216 that are further coupled to a network 218 that may be coupled to one or more user IHS's 211 and to the controller 202. In an embodiment, each of the switches 208a, 208b, 210a, and 210b may include a plurality of switch ports (e.g., 16 switch ports), and a switch port on each switch 208a, 208b, 210a, and 210b is coupled to a respective one of the NIC ports 206a-d, as illustrated. As described in further detail below, the switches 208a, 208b, 210a, and 210b may communicatively couple the server to a plurality of virtual local area networks (VLANs). For the sake of clarity, the network connections between the server 206 and switches 208a, 208b, 210a, and 210b have been simplified, and one of skill in the art will recognize that the IHS 200 may include any number of additional networking devices including hubs, switches, routers, load balancers, firewalls, servers, virtual networks, subnets, SANs, and other networking devices known in the art.

In the IHS 200, to provide for automated network configuration, access to VLANs is abstracted into channels. In an embodiment, channels define the allowed connectivity of a network interface to specific VLANs. In other words, a channel may define a network path through which only packets associated with specific VLANs may flow. In an embodiment, a channel may be associated with more than one VLAN. In the IHS 200, each switch port may be assigned a channel number. Accordingly, switch ports may only route packets to the VLANs associated with its assigned channel. Further, the NICs in server 206 may inherit the channel of the switch port to which they are connected. For example, if primary SAN switch 208a is assigned channel 1, the NIC providing NIC port 206a may also be assigned channel 1. Additionally, VLAN connectivity may overlap between channels—that is, a particular VLAN may be accessed thorough more than one channel. As such, access to a particular VLAN may be gained through a primary channel or a secondary channel, the latter of which provides a failover path.

The database 204 may include a plurality of personas that the controller 202 may boot on any suitable host in the IHS 200, such as the server 206. The personas contain configuration metadata including a number of attributes that describe its network connectivity, storage, and application-specific configuration. For example, an application in a persona may require network connections to specific networks (i.e. VLANs) for testing purposes. Whether a host in the IHS 200 is suitable for a persona is dependent in part on whether it can fulfill the persona's network connectivity requirements. In this regard, the aforementioned channel concept may be utilized by the controller 202 to match persona network connectivity requirements with host network connectivity capabilities.

Figure 3A:
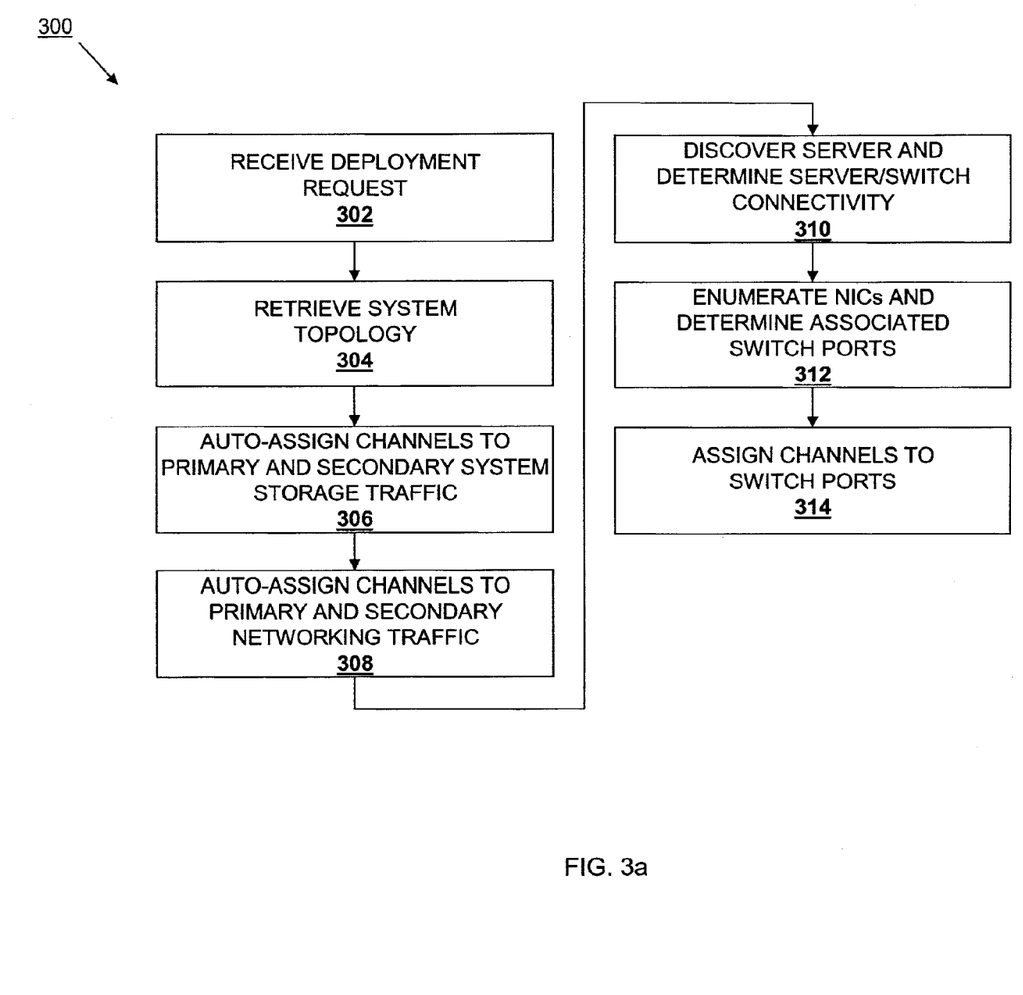
FIG. 3a is a flow chart illustrating an embodiment of a method for network infrastructure provisioning.

Referring now to FIGS. 2 and 3a, a method 300 for network infrastructure provisioning is illustrated. The method 300 begins at block 302 where a deployment request is received. In an embodiment, the controller 202 receives a request to deploy a persona stored in the database 204 from the user IHS 211 over the user network 218.

The method 300 then proceeds to block 304 where a system topology is retrieved. In an embodiment, the system topology retrieved in block 304 of the method 300 describes the connections between the server 206 and the interconnect fabric that are illustrated in FIG. 2. For example, as discussed above, each of the switches 208a, 208b, 210a, and 210b may include 16 switch ports, and at block 304 of the method 300, the controller 202 determines which of the switch ports are coupled to the NIC ports 206a-d, respectively. In an embodiment, the system topology may be manually determined and entered into the database 204, and the controller 202 retrieves that system topology from the database in block 304 of the method 300. In another embodiment, software methods known in the art may be used to automatically discover the system topology, and the controller 202 uses those software methods to retrieve the system topology in block 304 of the method 300. While a few examples of the retrieval of the system topology have been discussed, one of skill in the art will recognize that a wide variety of system topology retrieval methods may be used to retrieve a wide variety of system topologies while remaining within the scope of the present disclosure.

Referring now to FIGS. 2, 3a, 4a, and 4b, the method 300 proceeds to block 306 where channels are auto-assigned to primary and secondary storage traffic. As can be seen in the embodiment illustrated in FIG. 2, the server 206 is coupled to a SAN network that includes the storage fabric 208 (with primary SAN switch 208a and secondary SAN switch 208b), SAN distribution layer switches 212, and storage 214. FIGS. 4a-4f illustrate an IHS 400 that includes a server 402 requiring access to a plurality of VLAN's 402a, 402b, 402c, and one or more switches 404 that includes a plurality of switch ports 404a, 404b, 404c, and 404d. In an embodiment, the server 402 may be the server 206, described above with reference to FIG. 2. In an embodiment, the one or more switches 404 may be the switches 208a, 208b, 210a, and 210b, described above with reference to FIG. 2. Thus, the one or more switches may be one or more physical switches. In an embodiment, the VLAN 402a is a storage VLAN such as, for example, a VLAN for handling system control and SAN traffic.

Figure 4A:
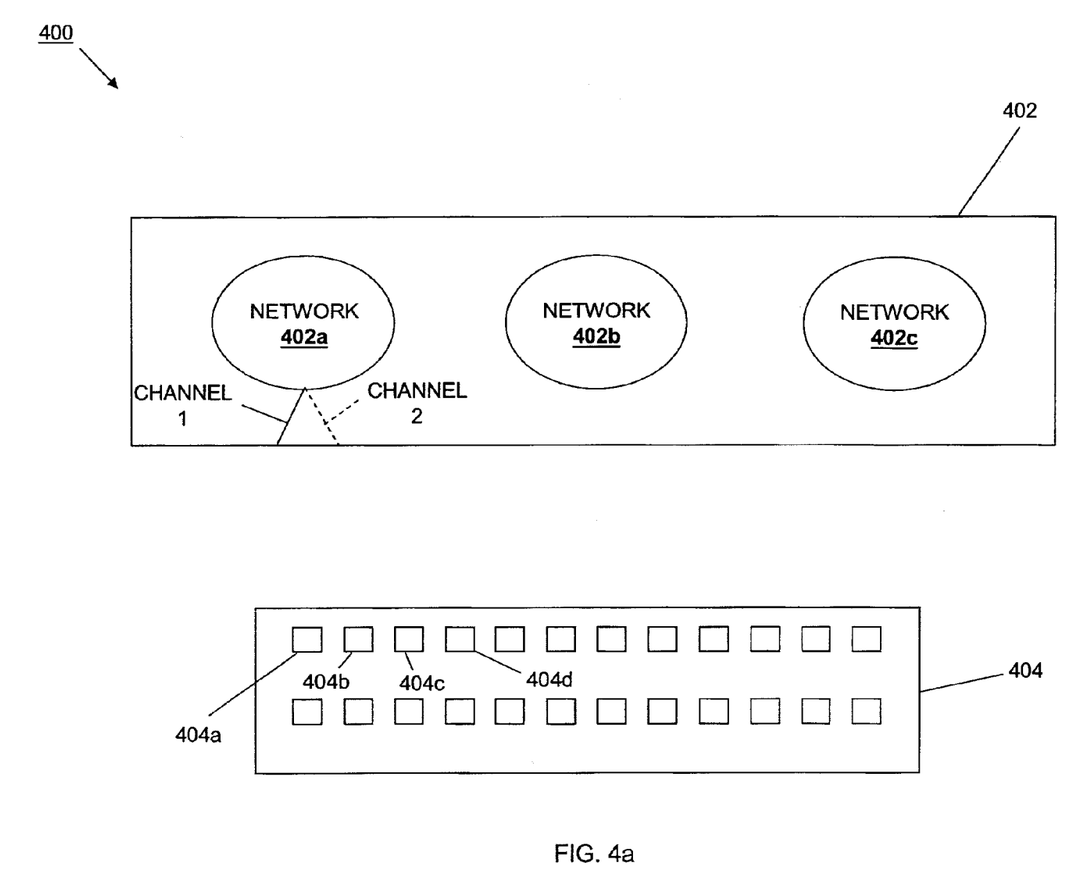
FIG. 4a is a schematic view illustrating an embodiment of the assignment of channels to system traffic.

In an embodiment, at block 306 of the method 300, the controller 202 automatically assigns a channel (e.g., CHANNEL 1) to primary storage traffic and a channel (e.g., CHANNEL 2) to secondary storage traffic, as illustrated in FIG. 4a. Thus, in the embodiment where the VLAN 402a is a storage VLAN such as, for example, a VLAN for handling system control and SAN traffic, system control and SAN traffic is automatically assigned channel 1 (e.g., as a channel for primary system control and SAN traffic—illustrated as a solid line in FIG. 4a) and channel 2 (e.g., as a channel for secondary system control and SAN traffic—illustrated as a dashed line in FIG. 4a).

The method 300 proceeds to block 308 where channels are auto-assigned to primary and secondary networking traffic. As can be seen in the embodiment illustrated in FIG. 2, the server 206 is coupled to a LAN network that includes the networking fabric 210 (with primary LAN switch 210a and secondary LAN switch 210b), LAN distribution layer switches 216, and network 218. FIGS. 4a-4f illustrates an IHS 400 that includes a server 402 requiring access to a plurality of VLANs 402a, 402b, 402c, and one or more switches 404 that includes a plurality of switch ports 404a, 404b, 404c, and 404d. In an embodiment, the server 402 may be the server 206, described above with reference to FIG. 2. In an embodiment, the one or more switches 404 may be the switches 208a, 208b, 210a, and 210b, described above with reference to FIG. 2. Thus, the one or more switches may be one or more physical switches. In an embodiment, the VLANs 402b and 402c are networking VLANs such as, for example, VLANs for handling networking traffic (e.g., the VLAN 402b may handle traffic on a corporate network and the VLAN 402c may handle traffic on a development network.)

Figure 4B:
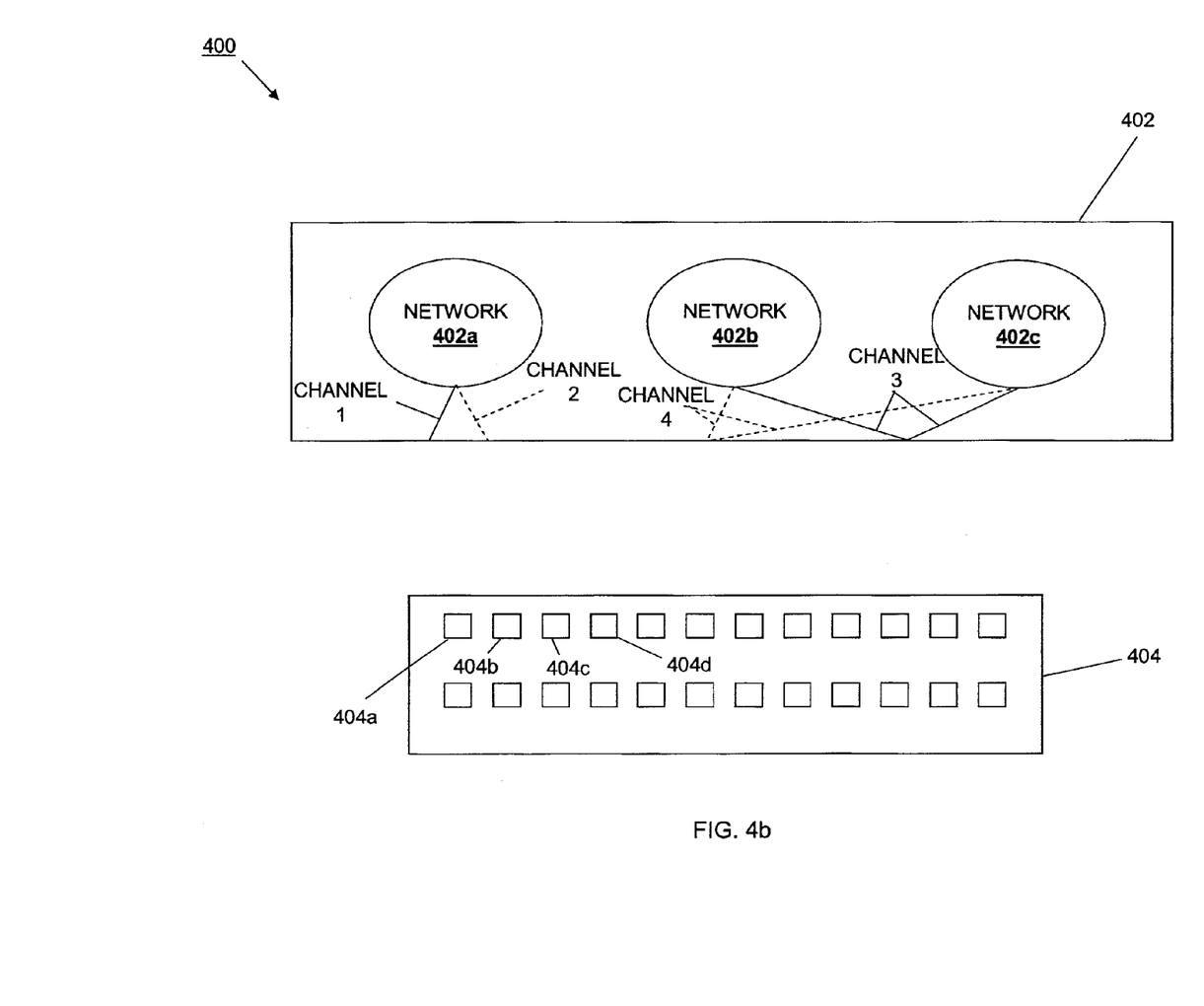
FIG. 4b is a schematic view illustrating an embodiment of the assignment of a first primary channel to a switch port associated with a first enumerated server port.
Figure 4C:
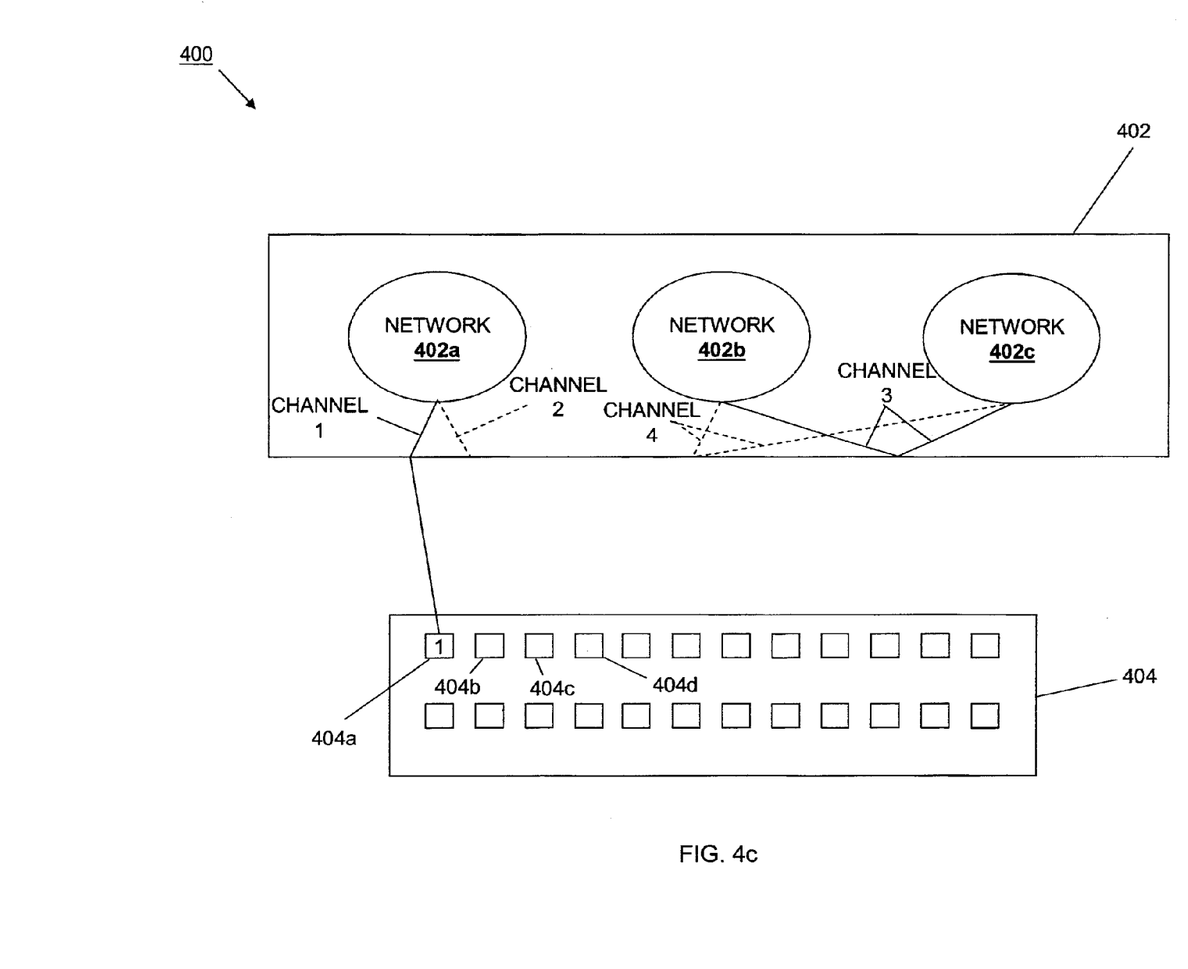
FIG. 4c is a schematic view illustrating an embodiment of the assignment of a first primary channel to a switch port associated with a first enumerated server port.
Figure 4D:
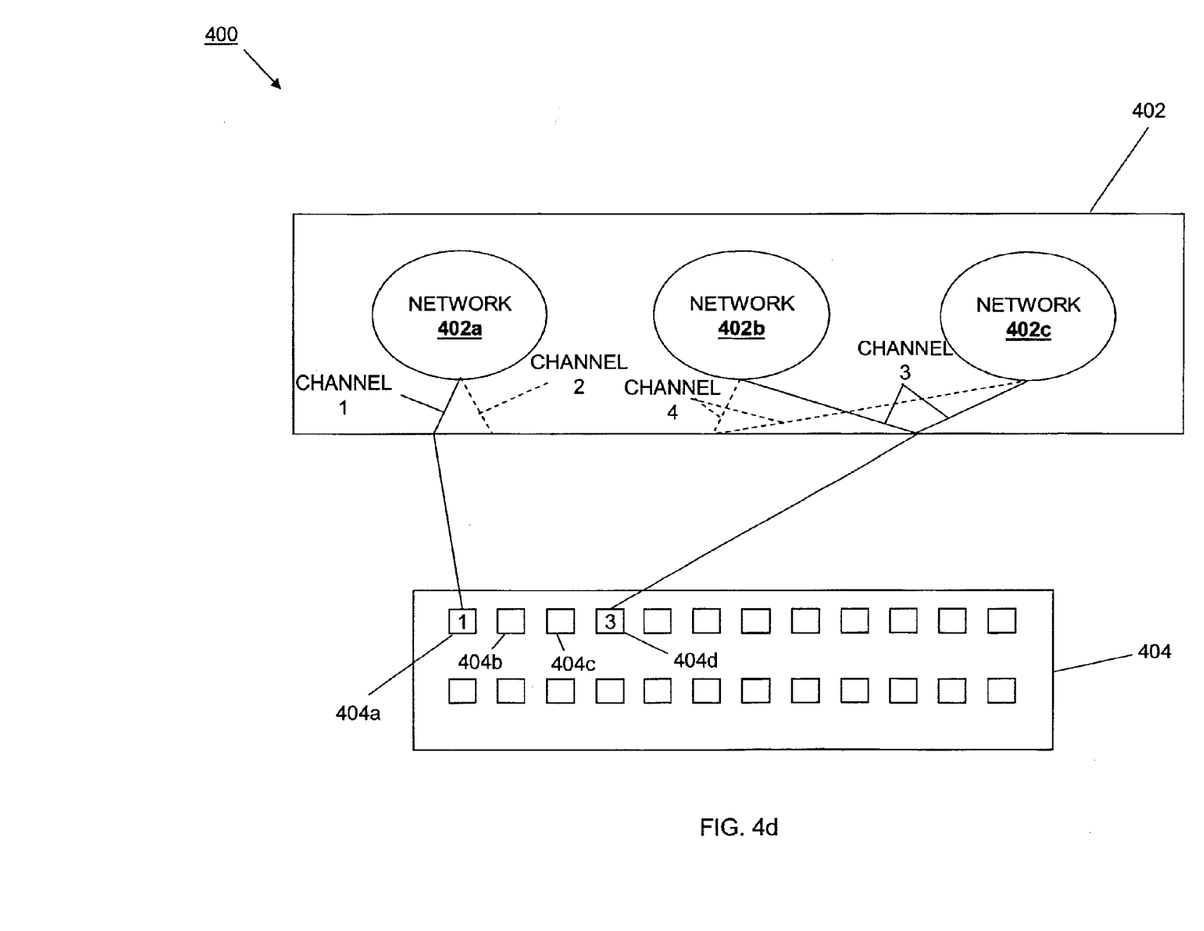
FIG. 4d is a schematic view illustrating an embodiment of the assignment of a second primary channel to a switch port associated with a last enumerated server port.
Figure 4E:
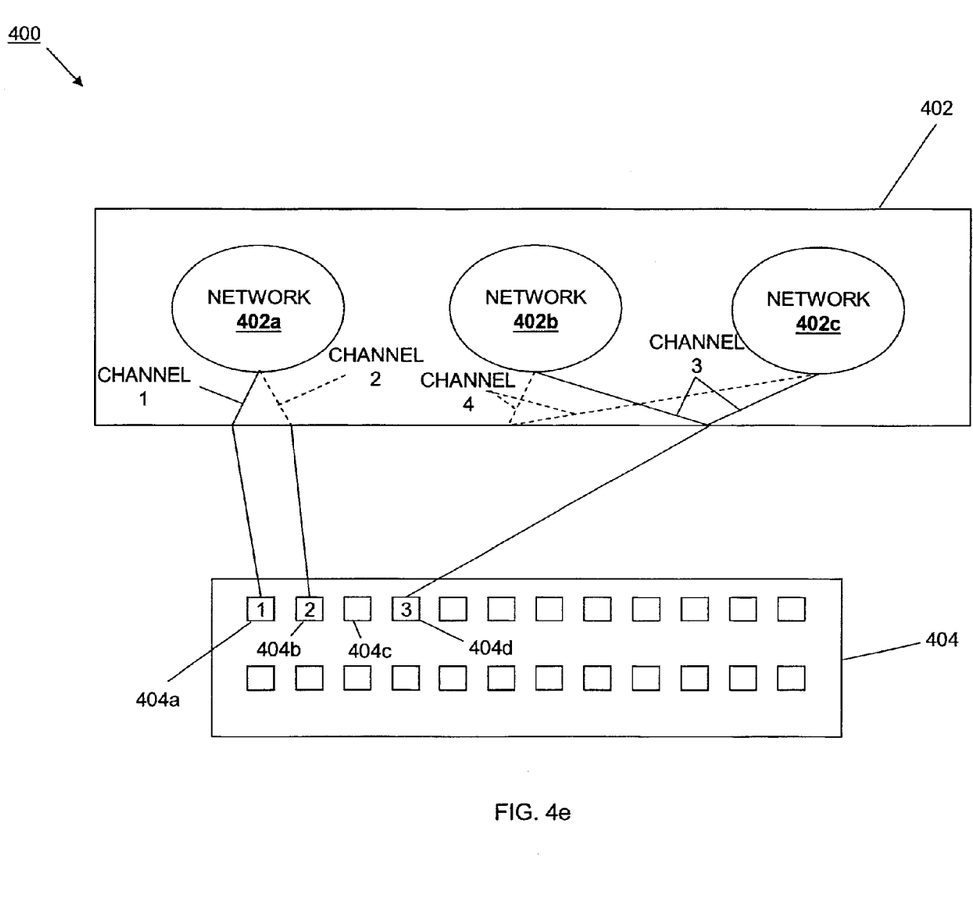
FIG. 4e is a schematic view illustrating an embodiment of the assignment of a first secondary channel to a switch port associated with an intermediate enumerated server port.
Figure 4F:
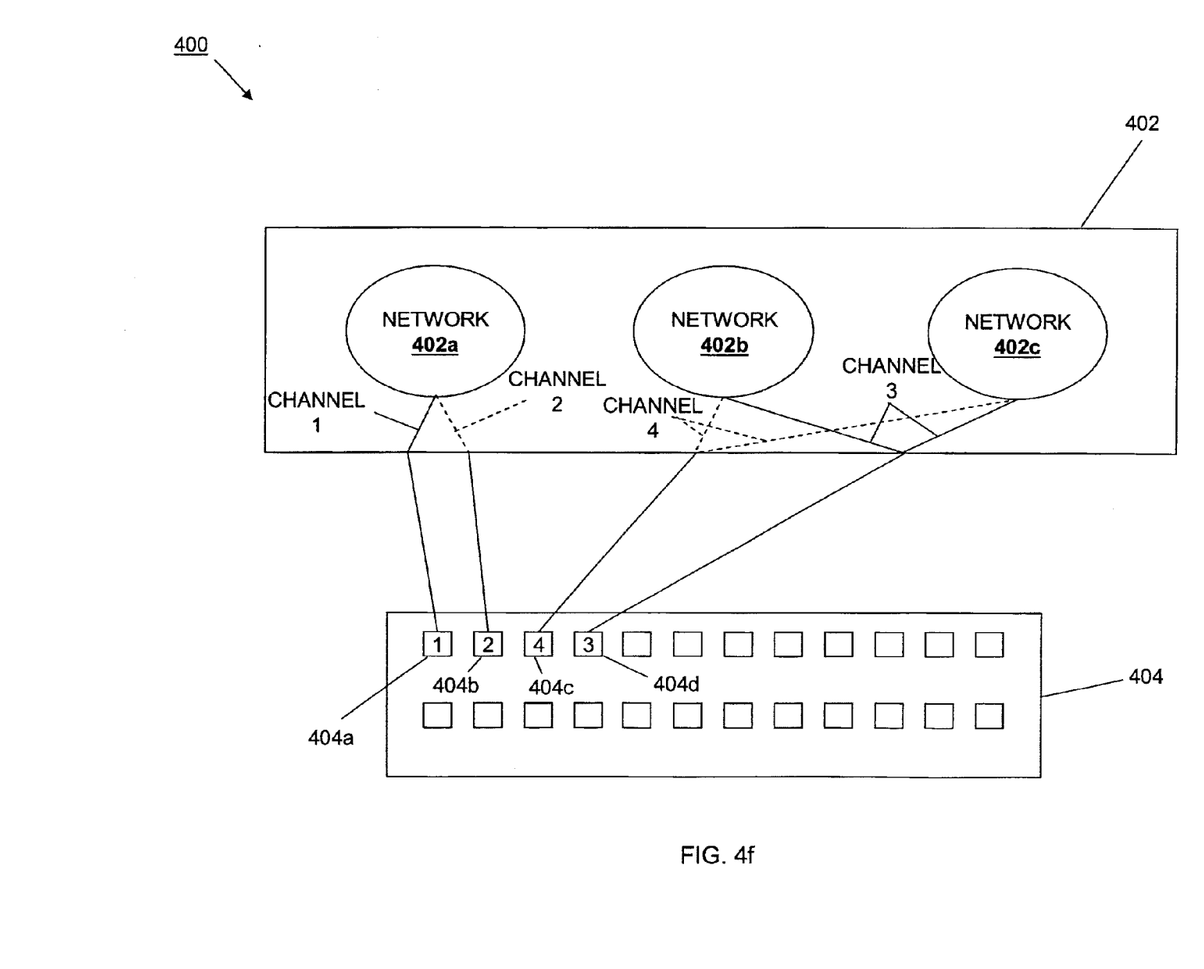
FIG. 4f is a schematic view illustrating an embodiment of the assignment of a second secondary channel to a switch port associated with an intermediate enumerated server port.

In an embodiment, at block 308 of the method 300, the controller 202 automatically assigns a channel (e.g., CHANNEL 3) to primary networking traffic and a channel (e.g., CHANNEL 4) to secondary networking traffic, as illustrated in FIG. 4b. Thus, in the embodiment where the VLANs 402b and 402c are networking VLANs such as, for example, VLANs for handling corporate network and developmental network traffic, respectively, that networking traffic is automatically assigned channel 3 (e.g., as a channel for primary networking traffic—illustrated as a solid line in FIG. 4b) and channel 4 (e.g., as a channel for secondary networking traffic—illustrated as a dashed line in FIG. 4b). In an embodiment, a round robin policy may be implemented to allocate networking traffic to primary and secondary channels in order to, for example, achieve load balancing.

The method 300 then proceeds to block 310 where a server is discovered and server switch connectivity is determined. In an embodiment, the controller 202 discovers the server 206/402 from a plurality of servers connected to the controller 202 through the network 208. As discussed above, when the controller 202 receives a request to boot a persona (e.g., a deployment request), the controller 202 will automatically discover a server on which to provide the persona based, for example, on the network connectivity requirements of the persona, user imposed criteria, and/or a variety of other information known in the art. With the server 206/402 discovered, a server/switch connectivity may be determined for the server 206/402 and the one or more switches 404. The server/switch connectivity may be determined using software methods known in the art, such as using server positioning to determine which NIC ports in the server 206/402 are connected to which switch ports in the switches 404 In one embodiment, the placement of a blade server within a chassis may be used to determine server port to switch port connectivity based on the constraints of the physical wiring in that chassis. For example, the physical wiring constraints of a system may be known such that when a blade server is positioned a particular slot in the system chassis, a first network port on that blade server will always connect to a particular switch, a second network port on that blade server will always connect to a particular switch, and so on. Server/switch connectivity may also be determined using alternative mechanisms such as, for example, booting a probe image on the server that activates the NICs and then monitoring the network switches to detect topology, such as is performed by the Dell Advanced Infrastructure Manager (AIM)\® product available from Dell Computers, Inc., and/or using a variety of other network topology discovery tools known in the art. In an embodiment, the server/switch connectivity includes information on which switch ports 404a, 404b, 404c, and 404d in the one or more switches 404 are connected to the server 402 (e.g., see the physical connections between the switches 208a, 208b, 210a, and 210b and the NIC ports 206a, 206b, 206c, and 206d in the server 206 illustrated in FIG. 2). In an embodiment, information in the server/switch connectivity may include, for each NIC in the server, a NIC identifier, a NIC Fully Qualified Device Descriptor (FQDD), an associated switch port, and an associated switch.

The method 300 then proceeds to block 312 where NICs in the server 206 are enumerated and the switch ports associated with those NICs are determined. In an embodiment, each NIC FQDD may be used to help identify the location of its associated NIC (e.g., embedded, slot, etc.), a port number for the NIC port, and a partition number for the NIC. The information identified using the NIC FQDD can be used to enumerate or order the NICs in the server 206. In the embodiment illustrated in FIG. 2, with the server 206 being a blade server, at block 312 of the method 300 the NICs coupled to storage fabric 208 (i.e., the "SAN-side NICs) would be enumerated before the NICs coupled to networking fabric 210 (i.e., the "LAN-side" NICs). Thus, at block 312 of the method 300, the NICs with their associated NIC ports are enumerated such that they are enumerated or ordered 1, 2, 3 . . . N. In an embodiment, NICs in a server may be ordered such that a first enumerated NIC is located in a first NIC slot in the server, a second enumerated NIC is located in a second NIC slot in the server, and so on.

Figure 3B:
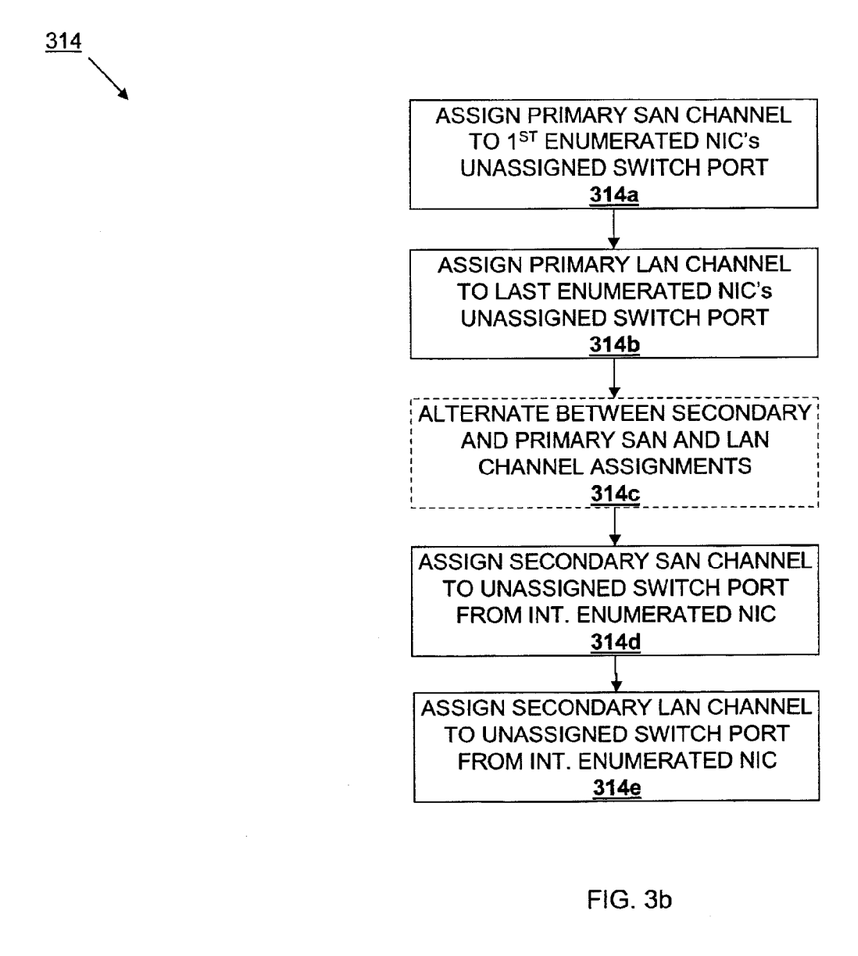

Referring now to FIGS. 2, 3a, 3b, and 4c-4f, the method 300 then proceeds to block 314 where channels are assigned to switch ports. FIG. 3b illustrates an embodiment of a method 314 for assigning channels to switch ports that includes several blocks that may be performed at block 314 of the method 300. As discussed below, some of the blocks in the method 314 may be optional depending on the number of switch ports determined in block 312 of the method 300.

The method 314 begins at block 314a where a first primary channel is assigned to a first enumerated NIC's unassigned switch port. In an embodiment, the controller 202 assigns the primary storage channel to the first enumerated switch port. For example, in the embodiment illustrated in FIG. 4c, switch port 404a is assigned channel 1 that was auto-assigned the primary system control and SAN traffic at block 306 of the method 300.

The method 314 then proceeds to block 314b where a second primary channel is assigned to a last enumerated NIC's unassigned switch port. In an embodiment, the controller 202 assigns the primary networking channel to the last enumerated switch port. For example, in the embodiment illustrated in FIG. 4d, switch port 404d is assigned channel 3 that was auto-assigned the primary LAN traffic at block 308 of the method 300.

The method 314 may then proceed to optional block 314c. In the illustrated embodiment, only 4 switch ports needing channel assignments are included in the IHS 400 for clarity of discussion, and optional block 314c is skipped. However, as discussed below, optional block 314c may be performed in the event there are more than 4 switch ports needing channel assignments in the IHS 400.

The method 314 then proceeds to block 314d where a first secondary channel is assigned to an intermediate enumerated NIC's unassigned switch port. In an embodiment, the controller 202 assigns the secondary storage channel to the unassigned switch port of the enumerated NIC that is immediately subsequent to the first enumerated NIC. For example, in the embodiment illustrated in FIG. 4e, switch port 404b is assigned channel 2 that was auto-assigned the secondary system control and SAN traffic at block 306 of the method 300.

The method 314 then proceeds to block 314e where a second secondary channel is assigned to an intermediate enumerated NIC's unassigned switch port. In an embodiment, the controller 202 assigns the secondary networking channel to the unassigned switch port of the enumerated NIC that is immediately prior to the last enumerated NIC. For example, in the embodiment illustrated in FIG. 4f, switch port 404c is assigned channel 4 that was auto-assigned the secondary LAN traffic at block 308 of the method 300. Following block 314e of the method 314 in the embodiment illustrated in FIGS. 4a-4f, all of the switch ports 404a-d have been automatically assigned channels by the controller 202, thus providing for the automated provision of channels to the switch ports in response to the discovery of the server 402.

Returning to optional block 314c of the method 314, some embodiments may include more than 4 switch ports that need to be assigned channels. In such embodiments, following the assignment of the first primary channel to the unassigned switch port in the first enumerated NIC and the second primary channel to the unassigned switch port in the last enumerated NIC, discussed above, with reference to blocks 314a and 314b, the controller 202 alternates between secondary and primary channel assignments for the unassigned switch ports of the enumerated NICs in the server 206/402. For example, at block 314c, the controller 202 may assign the secondary storage channel to the unassigned switch port of the enumerated NIC that is immediately subsequent to the first enumerated NIC (e.g., the second enumerated NIC), and then assign the secondary networking channel to the unassigned switch port of the enumerated NIC that is immediately prior to the last enumerated NIC (e.g., the second-to-last enumerated NIC) similarly as described above for blocks 314d and 314e of the method 314 (i.e., assign the secondary channels). Then the controller 202 may then assign primary channels, similarly as discussed above for blocks 314a and 314b of the method 300, to unassigned switch ports of the enumerated NICs that are immediately subsequent to the second enumerated NIC and immediately prior to the second-to-last enumerated NIC (i.e., assign the primary channels). One of skill in the art will recognize how the controller 202 may alternate between primary channel assignments and secondary channels assigns as described above to assign channels to unassigned switch ports for all the NICs enumerated in the server in block 312 of the method 300.

Thus, a system and method have been described that simplifies and automates the assignment of channels during network provisioning for a workload, thereby hiding the complexity of channel assignment from an administrator while following prescriptive best practices for business ready configurations (e.g., LAN/SAN segregation). The systems and methods described above results in the assignment of channels to NIC ports of a server (e.g., the NIC ports 206a-d of the server 206), thus enabling the segregation of traffic (e.g., storage and networking traffic) and redundancy (using primary and secondary traffic channels). While a specific embodiment including a specific system topology has been illustrated and described, one of skill in the art will recognize that the system and method described above may be modified to apply to a variety of system topologies. For example, modification to the order or precedence of the blocks of the methods may allow the method to be adjusted for a variety of different server-storage topologies. Furthermore, other types of network such as, for example, private isolated networks for clustered servers, may benefit from the methods discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network infrastructure provisioning system, comprising:
    a server including a plurality of server ports;
    at least one switch coupled to the server and including a plurality of switch ports; and
    a controller coupled to the server and the at least one switch, wherein the controller is configured to:
        automatically assign at least one channel to each of a plurality of different server traffic types to provide a plurality of channels that are each assigned to at least one server traffic type and that each define a network connectivity to at least one network;
        enumerate at least some of the plurality of server ports to provide a plurality of enumerated server ports;
        determine a plurality of connected switch ports from the plurality of switch ports that are connected to the plurality of enumerated server ports; and
        automatically assign each of the plurality of channels to a respective one of the plurality of connected switch ports, wherein the assignment of each channel to a connected switch port operates to define the network connectivity to at least one network for the enumerated server port that is connected to that connected switch port.

2. The system of claim 1, wherein the controller is further configured to:
    receive a deployment request from a user over a network, wherein the deployment request is associated with a workload that requires a first network connectivity to at least one first network.

3. The system of claim 1, wherein the controller is further configured to:
    retrieve a system topology that describes a connectivity between the plurality of switch ports and the plurality of server ports.

4. The system of claim 1, wherein the automatically assigning the at least one channel to each of the plurality of different server traffic types include automatically assigning at least one first channel to a primary server traffic type and at least one second channel to a secondary server traffic type.

5. The system of claim 1, wherein the controller is further configured to:
    discover the server and determine a server/switch connectivity for the server and the at least one switch.

6. The system of claim 1, wherein the automatically assigning each of the plurality of channels to the respective one of the plurality of connected switch ports includes:
    assigning a first primary channel to a first connected switch port that is connected to a first enumerated server port of the plurality of enumerated server ports;
    assigning a second primary channel to a last connected switch port that is connected to a last enumerated server port of the plurality of enumerated server ports;
    assigning a first secondary channel to a connected switch port that is connected to an enumerated server port between the first enumerated server port and the last enumerated server port; and
    assigning a second secondary channel to a connected switch port that is connected to an enumerated server port between the first enumerated server port and the last enumerated server port.

7. The system of claim 6, wherein the first primary channel is a primary storage channel, the second primary channel is a primary networking channel, the first secondary channel is a secondary storage channel, and the second secondary channel is a secondary networking channel.

8. An information handling system, comprising:
    a plurality of servers, each server including a plurality of server ports;
    a plurality of switches coupled to the plurality of servers, the plurality of switches including a plurality of switch ports;
    a controller coupled to the plurality of servers and the plurality of switches, wherein the controller is configured to:
        automatically assign at least one channel to each of a plurality of different server traffic types to provide a plurality of channels that are each assigned to at least one server traffic type and that each define a network connectivity to at least one network;
        enumerate at least some of the plurality of server ports on a first server in the plurality of servers to provide a plurality of enumerated server ports;
        determine a plurality of connected switch ports from the plurality of switch ports that are connected to the plurality of enumerated server ports; and
        automatically assign each of the plurality of channels to a respective one of the plurality of connected switch ports, wherein the assignment of each channel to a connected switch port operates to define the network connectivity to at least one network for the enumerated server port that is connected to that connected switch port.

9. The system of claim 8, wherein the controller is further configured to:
    receive a deployment request for a workload that requires a first network connectivity to at least one first network, wherein the controller automatically assigns channels to different server traffic types, enumerates the server ports, determines the connected switch ports, and automatically assigns channels to the connected switch ports in response to receiving the deployment request.

10. The system of claim 9, wherein the controller is further configured to:
    retrieve a system topology in response to receiving the deployment request, wherein the system topology describes a connectivity between the plurality of switch ports and the plurality of server ports.

11. The system of claim 8, wherein the automatically assigning the at least one channels to each of the plurality of different server traffic types includes automatically assigning at least one first channels to a primary server traffic type and at least one second channel to a secondary server traffic type.

12. The system of claim 8, wherein the controller is further configured to:
discover the first server and determine a server/switch connectivity for the first server and the plurality of switches.

13. The system of claim 8, wherein the automatically assigning each of the plurality of channels to the respective one of the plurality of connected switch ports includes:
assigning a first primary channel to a first connected switch port that is connected to a first enumerated server port of the plurality of enumerated server ports;
assigning a second primary channel to a last connected switch port that is connected to a last enumerated server port of the plurality of enumerated server ports;
assigning a first secondary channel to a connected switch port that is connected to an enumerated server port between the first enumerated server port and the last enumerated server port; and
assigning a second secondary channel to a connected switch port that is connected to an enumerated server port between the first enumerated server port and the last enumerated server port.

14. The system of claim 13, wherein the automatically assigning pt least one channels to each of the plurality of different server traffic tyoes includes assigning at least one channels to primary storage traffic, secondary storage traffic, primary networking traffic, and secondary networking traffic, and wherein the first primary channel is a primary storage channel, the second primary channel is a primary networking channel, the first secondary channel is a secondary storage channel, and the second secondary channel is a secondary networking channel.

15. A method for network infrastructure provisioning, comprising:
automatically assigning at least one channels to each of a plurality of different traffic types associated with an information handling system (IHS) in order to provide a plurality of channels that are each assigned to at least one traffic type and that each define a network connectivity to at least one network;
enumerating at least some of a plurality of IHS ports on the IHS to provide a plurality of enumerated IHS ports;
determining a plurality of connected switch ports on at least one switch that are connected to the plurality of enumerated IHS ports; and
automatically assigning each of the plurality of channels to a respective one of the plurality of connected switch ports, wherein the assignment of each channel to a connected switch port operates to define the network connectivity to at least one network for the enumerated IHS port that is connected to that connected switch port.

16. The method of claim 15, further comprising:
receiving a deployment request for a workload that requires a first network connectivity to at least one first network, wherein the automatically assigning channels to different traffic types, enumerating the IHS ports, determining the connected switch ports, and automatically assigning channels to the connected switch ports are performed in response to receiving the deployment request.

17. The method of claim 15, wherein the automatically assigning the channels to different traffic types includes automatically assigning at least one first channel to primary traffic type and at least one second channel to a secondary traffic type.

18. The method of claim 15, further comprising:
discovering the IHS and determining an IHS/switch connectivity for the IHS and the at least one switch.

19. The method of claim 15, wherein the automatically assigning each of the plurality of channels to the respective one of the plurality of connected switch ports includes:
assigning a first primary channel to a first connected switch port that is connected to a first enumerated IHS port of the plurality of enumerated IHS ports;
assigning a second primary channel to a last connected switch port that is connected to a last enumerated IHS port of the plurality of enumerated IHS ports;
assigning a first secondary channel to a connected switch port that is connected to an enumerated IHS port between the first enumerated IHS port and the last enumerated IHS port; and
assigning a second secondary channel to a connected switch port that is connected to an enumerated IHS port between the first enumerated IHS port and the last enumerated IHS port.

20. The method of claim 15, wherein the first primary channel is a primary storage channel, the second primary channel is a primary networking channel, the first secondary channel is a secondary storage channel, and the second secondary channel is a secondary networking channel.

* * * * *